United States Patent
Sauter et al.

(10) Patent No.: US 8,744,701 B2
(45) Date of Patent: Jun. 3, 2014

(54) METHOD TO CONTROL A MOTOR VEHICLE POWER TRAIN

(75) Inventors: Ingo Sauter, Meckenbeuren (DE); Melchor Moro-Oliveros, Friedrichshafen (DE); Michael Burkhart, Ravensburg (DE)

(73) Assignee: ZF Friedrichshafen AG, Friedrichshafen (DE)

(*) Notice: Subject to any disclaimer, the term of this patent is extended or adjusted under 35 U.S.C. 154(b) by 878 days.

(21) Appl. No.: 12/579,528

(22) Filed: Oct. 15, 2009

(65) Prior Publication Data

US 2010/0100290 A1 Apr. 22, 2010

(30) Foreign Application Priority Data

Oct. 20, 2008 (DE) .................. 10 2008 042 959

(51) Int. Cl.
- G06F 7/00 (2006.01)
- G06F 17/00 (2006.01)
- G06F 19/00 (2011.01)

(52) U.S. Cl.
USPC ............... 701/52; 701/51; 701/67; 74/473.3

(58) Field of Classification Search
USPC .............. 701/33.6, 48, 51, 52, 62, 67, 70, 96, 701/117, 55, 36, 50; 74/335, 473.1, 473.18, 74/473.21, 473.3, 473.26, 523; 477/3, 34, 477/48, 78, 97, 109, 111, 114, 115, 116, 477/121, 125, 175, 2, 71, 74, 94, 99, 44; 192/3.58, 3.63, 54.1, 218, 220.4, 3.55; 307/10.1, 10.6; 180/315
See application file for complete search history.

(56) References Cited

U.S. PATENT DOCUMENTS

| | | | | |
|---|---|---|---|---|
| 4,884,669 A | * | 12/1989 | Ehrlinger | 192/216 |
| 5,416,700 A | * | 5/1995 | Bates et al. | 701/52 |

(Continued)

FOREIGN PATENT DOCUMENTS

| | | |
|---|---|---|
| DE | 38 07 881 A1 | 9/1989 |
| DE | 197 36 406 A1 | 3/1999 |

(Continued)

*Primary Examiner* — Tuan C. To
*Assistant Examiner* — Isaac Smith
(74) *Attorney, Agent, or Firm* — Davis & Bujold, PLLC; Michael J. Bujold

(57) ABSTRACT

The invention concerns a method for controlling a motor vehicle drivetrain which comprises a drive motor, a multi-step, automated change-speed transmission and an automated separating clutch arranged between the drive motor and the transmission, and a shifting device with a selector lever which can be moved at least from a particular position in an upshift direction ("+" direction) for manually initiating an upshift and in a downshift direction ("−") for manually initiating a downshift, and in which the transmission and the separating clutch can be controlled by a transmission control unit which is connected at least to a speed sensor, a brake pedal actuation sensor and a selector lever actuation sensor, such that when the motor vehicle is rolling with its drivetrain open the closing of the drivetrain is initiated by actuating the selector lever.

To improve the functional safety it is provided that when a first movement of the selector lever in a shift direction ("+" direction or "−" direction) is sensed, this is interpreted as a provisional command to close the drivetrain, and if a second movement of the selector lever in the same shift direction ("+" direction or "−" direction) is sensed within a specified confirmation time ($\Delta t_B$), this is interpreted as a confirmation of the provisional command to close the drivetrain and, as an implementation command, initiates the closing of the drivetrain.

13 Claims, 1 Drawing Sheet

(56) References Cited

U.S. PATENT DOCUMENTS

| | | |
|---|---|---|
| 5,664,458 A | 9/1997 | Stasik et al. |
| 5,946,976 A * | 9/1999 | Miyoshi et al. ............ 74/473.18 |
| 5,984,828 A * | 11/1999 | Huber ............................ 477/78 |
| 6,035,735 A | 3/2000 | Graf et al. |
| 6,073,507 A * | 6/2000 | Ota et al. ........................ 74/335 |
| 6,411,879 B2 * | 6/2002 | Kupper et al. .................. 701/51 |
| 6,544,141 B1 * | 4/2003 | Fuchs et al. ..................... 477/44 |
| 6,849,029 B2 | 2/2005 | Loeffler |
| 6,939,265 B2 | 9/2005 | Rustige et al. |
| 7,017,692 B2 | 3/2006 | Grassl et al. |
| 2001/0045138 A1 * | 11/2001 | Ohashi et al. ............... 74/336 R |
| 2009/0000851 A1 | 1/2009 | Griesmeier et al. |

FOREIGN PATENT DOCUMENTS

| | | |
|---|---|---|
| DE | 102 21 701 A1 | 11/2002 |
| DE | 101 60 819 A1 | 6/2003 |
| DE | 103 49 445 A1 | 5/2004 |
| DE | 10 2005 003 608 A1 | 8/2006 |
| DE | 10 2006 004 080 A1 | 8/2007 |
| EP | 04 67 773 A1 | 1/1992 |
| EP | 1 320 472 B1 | 6/2003 |

* cited by examiner

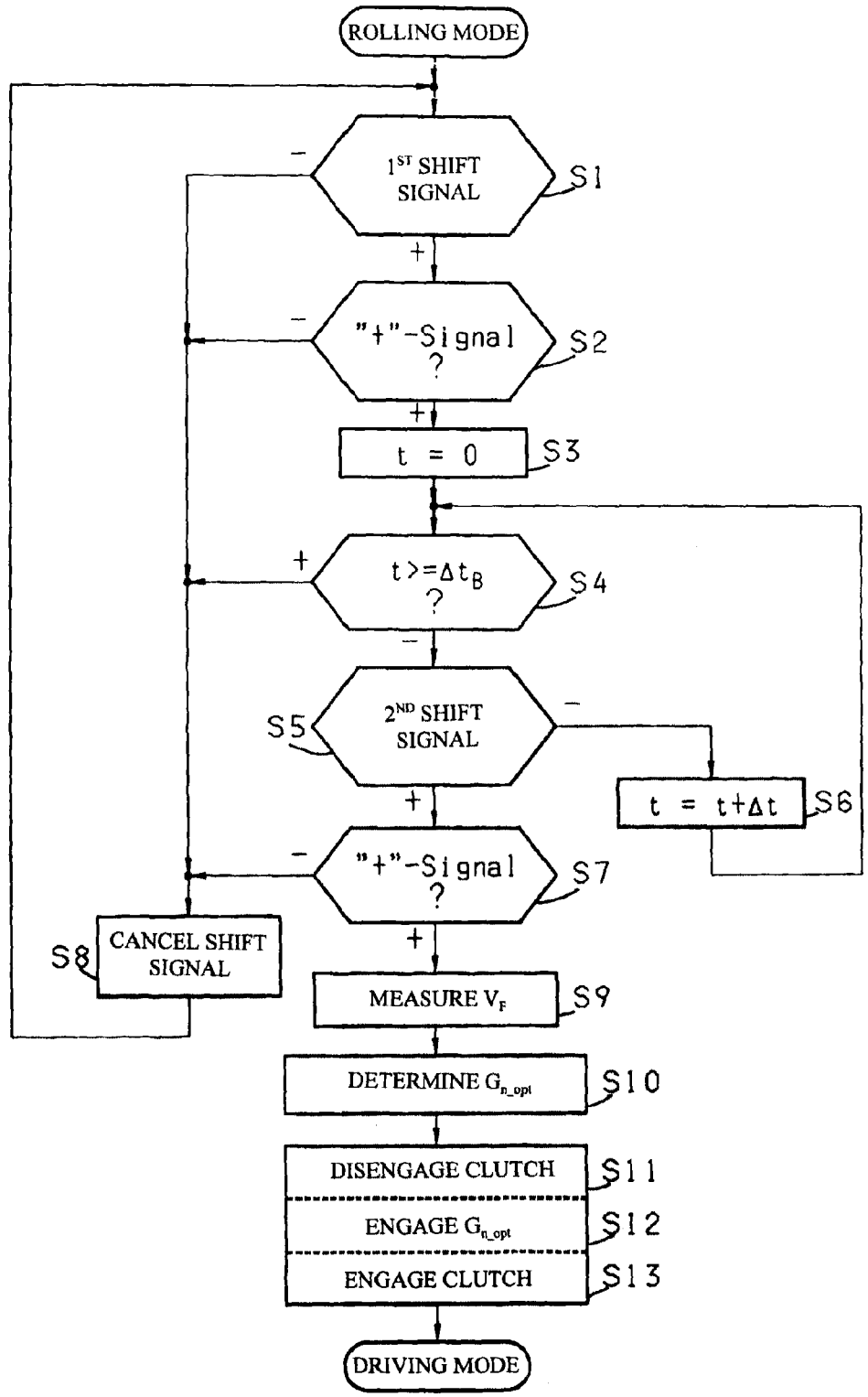

METHOD TO CONTROL A MOTOR VEHICLE POWER TRAIN

This application claims priority from German patent application serial no. 10 2008 042 959.7 filed Oct. 20, 2008.

FIELD OF THE INVENTION

The invention concerns a method for controlling a motor vehicle drivetrain which comprises a drive motor, a multi-step automated change-speed transmission, an automated separating clutch arranged in the force flow between the drive motor and the transmission, and a shifting device with a selector lever that can be moved at least to a particular position for manually initiating an upshift, in an upshift direction, and for manually initiating a downshift, in a downshift direction, and in which the change-speed transmission and the separating clutch can be controlled by means of a transmission control unit connected at least to a speed sensor, an actuation sensor of an accelerator pedal and an actuation sensor of the selector lever, such that when the motor vehicle is rolling with its drivetrain disengaged, engagement of the drivetrain is initiated by actuating the selector lever.

BACKGROUND OF THE INVENTION

Automated change-speed transmissions can usually be operated both in an automatic mode with automatic initiation of gearshifts and in a manual shift mode with manual initiation of gearshifts. The engagement and disengagement of gears and the engagement and disengagement of the separating clutch take place, in each case, automatically by corresponding actuation of associated gear and clutch control elements, which are preferably in the form of hydraulic or pneumatic control cylinders or of electric motors. Various shifting devices, with different possible ways of actuating a selector lever, have become known for the manual selection of the automatic drive steps and the manual initiation of gearshifts.

A typical embodiment of a shifting device of an automated transmission is described, for example, in DE 38 07 881 C2. This known shifting device comprises an automatic shift gate extending in the longitudinal direction of the vehicle, in which the selector lever can be moved to drive-position P, for engaging the parking lock, drive-position R, for engaging the reversing gear, the neutral position N, drive-position D, for the automatic shift initiation of forward gears, and drive-positions 3, 2, 1 for the automatic initiation of forward gears with an upshift limitation. In addition the shifting device, has a manual shift gate extending parallel to the automatic shift gate, into which the selector lever can be moved, by being pivoted transversely, from a drive-position D of the automatic shift gate. Within the said manual shift gate, the selector lever is held by springs in a neutral central position. By moving the selector lever within the manual shift gate in the direction of a "+" position, arranged forward in the driving direction, an upshift, and in the direction of a "−" position, arranged rearward in the driving direction, a downshift can be initiated manually.

In another shifting device illustrated only schematically in EPO 467 773 B1, the neutral, central position marked M of the selector lever of a manual shift gate orientated transversely to the driving direction is located within the automatic shift gate that extends in the driving direction, between drive-position D for the automatic shift initiation of forward gears and an upshift-limiting stage 1. By moving the selector lever within the manual shift gate toward a "+" position on the right, relative to the driving direction, an upshift, and toward a "−" position on the left, relative to the driving direction, a downshift can be initiated manually.

In a shifting device known from DE 197 36 406 B4, the drive-position D of the automatic shift gate forms, at the same time, the neutral, central position of a fictive manual shift gate. In a first embodiment of this shifting device, an upshift can be initiated manually by a slight movement of the selector lever within the automatic shift gate toward a "+" position, arranged forward in the driving direction, and a downshift by a slight movement of the selector lever within the automatic shift gate toward a "−" position, arranged rearward in the driving direction. In a second embodiment variant of this shifting device, an upshift can be initiated manually by a slight movement of the selector lever within the D-position of the automatic shift gate toward the "+" position, arranged on the left relative to the driving direction, and a downshift by a slight movement of the selector lever toward the "−" position, arranged on the right relative to the driving direction.

From the motor vehicle "Smart Fortwo with Softip Shifting", which has no automatic shift initiation for the engagement of forward gears, a shifting device is known in which the automatic shift gate is reduced to the neutral position N and the drive-position R for engaging the reversing gear. In the manual or 'tip' shift gate that runs parallel to the automatic shift gate, the selector lever can be moved, by a transverse pivoting, from the neutral position N of the automatic shift gate. In this shifting device, an upshift can be initiated manually by moving the selector lever within the manual shift gate from its neutral, central position toward a "+" position, arranged forward in the driving direction, and a downshift by moving it toward a "−" position, arranged rearward relative to the driving direction.

When the manual shift mode of the shifting device is actuated, i.e., when the selector lever is in the respective neutral, central position of the manual shift gate provided, operating situations can arise in which the motor vehicle is rolling with its drivetrain disengaged. The drivetrain is disengaged when the transmission is in its neutral position so that no gear is engaged, and/or the separating clutch is disengaged. Rolling with the drivetrain disengaged can occur during a starting process on an uphill or downhill stretch, and a distinction is made between rolling in the desired starting direction and rolling (rolling back) in the direction opposite to the desired direction.

When rolling at a relatively low travel speed, however, this may also result in rolling forward at a cross-road or at a red traffic-light. But rolling of the motor vehicle with the drivetrain disengaged can also take place at higher speeds, in particular when the motor vehicle is operated in a mode in which, when neither the accelerator pedal nor the brake pedal are actuated, at least the separating clutch disengages automatically and the motor vehicle concerned is allowed to roll with its drivetrain disengaged (also known as "coasting"). During traffic-related rolling ahead, at relatively low speed, and rolling in the coasting mode, at relatively high speed, the braking action of the drive motor otherwise present during a thrust operation is absent, which leads to fuel saving that can be increased still further by stopping the drive motor in the context of a start-stop operating mode.

However, regardless of its cause, rolling of the vehicle with its drivetrain disengaged is generally considered unsafe since, in such driving situation, the rolling or driving speed cannot be controlled by the driver using the accelerator pedal, as is otherwise usual, and the braking action of the drive motor that exists in a thrust operation is not available. Accordingly, in the corresponding drivetrains at least a control function is always provided by means of which, in the manual shift mode, rolling with an disengaged drivetrain can, when necessary, be ended by some appropriate control action by the driver, in particular by actuating the selector lever.

A control action that can be performed simply and quickly by the driver, for initiating a corresponding control sequence, consists in moving the selector lever just once out of the neutral, central position in the upshift direction, this also being provided in many automated transmissions. A corresponding control process of a motor vehicle drivetrain comprising a semi-automated transmission with a manual shift initiation is, for example, described in U.S. Pat. No. 5,664, 458 A. This known method relates to the engagement of the drivetrain in a motor vehicle that is rolling with its drivetrain disengaged, such that provision is made for determining and engaging a starting gear, suitable for the actual rolling or travel speed, if a minimum speed is exceeded with the separating clutch disengaged.

On the other hand, from DE 102 21 701 A1 a method is known for controlling a motor vehicle drivetrain, during a so-called coasting operation of the said motor vehicle, in which the drivetrain is engaged by actuating the accelerator pedal or the brake pedal. With the transmission in neutral and the separating clutch disengaged, it is provided that after the signal to engage the drivetrain, the gear engaged before the drivetrain was disengaged, or at a higher vehicle speed even a higher gear is engaged, and the speed of the drive motor is matched to the speed of the transmission input shaft before the separating clutch is engaged.

A single movement of the selector lever in a particular shift direction during rolling can, however, also take place unintentionally by inadvertent touching of the selector lever by the driver or a front-seat passenger and, with a drivetrain controlled in accordance with the method of U.S. Pat. No. 5,664, 458 A, this causes the drivetrain to engage in a manner that takes the driver by surprise and is undesired per se. Furthermore, if a vehicle is rolling at a higher speed in a coasting mode and the drivetrain is controlled in accordance with the method of DE 102 21 701 A1, even a relatively brief and slight actuation of the brake pedal will engage the drivetrain, although the driving situation may not require this and the driver does not wish it.

SUMMARY OF THE INVENTION

Accordingly, the purpose of the present invention is to indicate an improved method for controlling a drivetrain of the type mentioned at the start, by means of which, in a motor vehicle rolling with its drivetrain disengaged, the drivetrain can be engaged by the driver by actuating the selector lever intentionally and with greater functional safety.

This objective is achieved if a sensed, first movement of the selector lever in a shift direction, i.e., in the "+" direction or the "−" direction, is interpreted as a provisional command to engage the drivetrain, and a sensed second movement of the selector lever, in the same shift direction ("+" direction or "−" direction) within a specified confirmation time $\Delta t_B$, is interpreted as confirming the said provisional command to engage the drivetrain and, as an implementation command, initiates the engagement of the drivetrain.

The method according to the invention starts from a motor vehicle drivetrain comprising a drive motor, a multi-stage automated change-speed transmission, an automated separating clutch arranged in the force flow, between the drive motor and the transmission, and a shifting device with a selector lever that can be moved at least to a particular position for the manual initiation of an upshift in an upshift direction ("+" direction) and, for initiating a downshift, in a downshift direction ("−" direction). The transmission and the separating clutch can be controlled by means of a transmission control unit connected at least to a speed sensor, an accelerator pedal actuation sensor and a selector lever actuation sensor. As is usual in principle in many automated transmissions and, for example, is also known from U.S. Pat. No. 5,664,458 A, when a motor vehicle is rolling with its drivetrain disengaged, engagement of the drivetrain is initiated by actuating the selector lever.

In that according to the invention, a sensor-detected first movement of the selector lever in a shifting direction ("+" or "−" direction) does not yet lead to immediate engagement of the drivetrain, but rather a second selector lever movement, in the same shifting direction ("+" or "−" direction) within a specified confirmation time $\Delta t_B$, i.e., a time specifically applicable to the motor vehicle concerned, is needed for the engagement of the drivetrain to be initiated, erroneous operation by unintended touching of the selector lever or ill-considered actuation of the selector lever, for example, if the motor vehicle starts rolling unexpectedly, is largely excluded. With the method according to the invention, the functional reliability of the transmission control and, at the same, the operational safety of the motor vehicle concerned are therefore increased, since due to the need to move the selector lever twice in the same shifting direction ("+" "−" direction), engagement of the drivetrain which takes the driver by surprise, which he does not want and which is usually associated with high load peaks, is reliably avoided and engagement of the drivetrain by a corresponding actuation of the selector lever by the driver can only be initiated intentionally and after due consideration.

According to a further development of the invention, the provisional command to engage the drivetrain is cancelled if no movement of the selector lever in the same shifting direction ("+" or "−" direction) is sensed within the confirmation time $\Delta t_B$.

Likewise, the provisional command to engage the drivetrain is advantageously also cancelled if, within the confirmation time $\Delta t_B$, a movement of the selector lever in the opposite shifting direction ("−" direction or "+"-direction respectively) is sensed. Thus, the driver has the possibility to correct a recognized erroneous operation immediately by moving the selector lever in the opposite shifting direction, i.e., cancelling it.

A sensed second movement of the selector lever, in the same shifting direction ("+" or "−" direction) to initiate engagement of the drivetrain, must take place within the confirmation time $\Delta t_B$, preferably set at a value between 2 and 5 seconds, since during this interval the second movement of the selector lever can be carried out without problems, whereas over such an interval the travel or rolling speed of the motor vehicle is unlikely to change very much.

In particular, the method according to the invention provides that when a twofold movement of the selector lever in the upshift direction ("+" direction) is sensed, the current driving speed $V_F$ is measured, a forward gear $G_{n\_opt}$ appropriate for the current speed $V_F$ is determined, and the drivetrain is engaged in combination with the engagement of the said appropriate forward gear $G_{n\_opt}$ and the engagement the separating clutch. In a manner known per se, the appropriate forward gear $G_{n\_opt}$ can be determined by selecting that forward gear $G_n$ whose transmission ratio $i_{G\_n}$, to within a specified tolerance threshold, matches the quotient of the drive motor's speed $N_M$ at the time and the speed of the output shaft $N_{GA}$ of the transmission at the time, or is slightly smaller than it ($i_{G\_n} < N_M/N_{GA}$).

However, the method according to the invention can also provide that if a twofold movement of the selector lever in the downshift direction ("−" direction) is sensed, the current driving speed $V_F$ is measured and if only one reversing gear R is available, the drivetrain is engaged in combination with engaging the reversing gear R and engaging the separating clutch, provided that the current driving speed $V_F$ does not exceed a specified rolling limit speed $V_{Roll\_max}$ ($V_F < V_{Roll\_max}$). The restriction to driving speeds $V_F$ below the said rolling limit speed $V_{Roll\_max}$ serves to avoid overloading the drivetrain, in particular to avoid exceeding the maximum motor speed $N_{M\_max}$ of the drive motor.

If, as is usual in heavy goods vehicles, a number of reversing gears $R_n$ are available, it is provided that if a twofold movement of the selector lever in the downshift direction ("−" direction) is sensed, the current driving speed $V_F$ is measured, a reversing gear $R_{n\_opt}$ appropriate for the current driving speed $V_F$ is determined, and the drivetrain is engaged in combination with the engagement of the appropriate reversing gear $R_{n\_opt}$ and the engagement of the separating clutch, provided that the current driving speed $V_F$ does not exceed the specified rolling limit speed $V_{Roll\_max}$ ($V_F < V_{Roll\_max}$).

In the above process sequences, agreement between the rolling direction of the motor vehicle and the drive direction of the engaged drivetrain is not automatically checked by the transmission control unit and if necessary corrected, but must be evaluated by the driver who then acts accordingly. Thus, if the motor vehicle is rolling backward, i.e., rolling in the direction opposite to the desired starting direction, it is perfectly possible to recover from and reverse this movement by engaging the drivetrain with a starting gear directed opposite to the rolling direction, with correspondingly firm actuation of the accelerator pedal during a temporary slipping operation of the separating clutch.

If the driver wishes, by means of a twofold movement of the selector lever in the downshift direction ("−" direction), to engage the drivetrain in combination with engaging a reversing gear (R, $R_{n\_opt}$) to protect the drivetrain, it is advantageously provided that the corresponding implementation command is cancelled without implementation and an acoustic and/or visual warning signal is emitted if the current driving speed $V_F$ exceeds the specified rolling limit speed $V_{Roll\_max}$ ($V_F > V_{Roll\_max}$).

In order to alert the driver, during rolling with an disengaged drivetrain, to the fact that an inadvertent or erroneous provisional command to engage the drivetrain has been sensed, after a first movement of the selector lever in a shifting direction ("+" or "−" direction) has been sensed, it is advantageous to emit an acoustic and/or visual signal for the purpose of informing the driver. The acoustic signal can be, for example, a beeping tone which alerts the driver that the transmission control unit has registered the provisional command. A corresponding visual signal can be emitted by illuminating a warning light, in particular one positioned on the instrument panel.

As a visual indication that a provisional command to engage the drivetrain has been registered, it is also possible to show the drive direction (forward or reverse) specified by the movement direction of the selector lever ("+" direction or "−" direction), in a display provided in order to indicate the gears, together with a question-mark, for example "D?" for engaging the drivetrain with a forward gear $G_{n\_opt}$ and "R?" for engaging it with a reversing gear (R, $R_{n\_opt}$).

To attract the driver's attention, a signal informing him that a first movement of the selector lever in a shift direction ("+" or "−" direction) has been sensed can be emitted only for a short time. But to make it clear to the driver that a second actuation of the selector lever is necessary in order to confirm the provisional command, the signal is preferably emitted until the second movement of the selector lever, in the same shift direction ("+" or "−" direction), has been sensed, or until the provisional command to engage the drivetrain has been cancelled, for example, after the lapse of the confirmation time.

BRIEF DESCRIPTION OF THE DRAWINGS

To clarify the invention, the description of a drawing showing an example embodiment is attached. In this, FIG. 1 shows a flow chart of a preferred variant of the control method according to the invention.

DETAILED DESCRIPTION OF THE PREFERRED EMBODIMENTS

The process for controlling an automated motor vehicle drivetrain, represented in a simplified variant as an example in FIG. 1, is used when the said vehicle is rolling with its drivetrain disengaged, i.e., when its travel speed $V_F > 0$, and when engagement of the drivetrain should be initiated by actuating the selector lever. Since, in the present case, it is assumed that the separating clutch is of the passive-engaging type, such as a diaphragm spring clutch, which is arranged in the force flow between the drive motor and the transmission and which is engaged in its unactuated, rest position, the transmission is then in its neutral position, i.e., no gear is engaged.

In a rolling mode of the drivetrain control system, it is first checked in step S1 whether a first shift signal produced by actuating an associated selector lever is present. If so, it is checked in the next step S2 whether the signal concerned is for an upshift ("+" signal), i.e., whether the selector lever was moved in the upshift direction. If so, in step S3 a time count is started by initializing a time variable t.

Then, it is checked in step S4 whether a specified confirmation time $\Delta t_B$ has been reached or exceeded. If not, it is checked in the next step S5 whether a second shift signal is present, which has been produced by a second actuation of the selection lever in a shift direction. If no such second shift signal is present, in a delay step S6 the time variable is increased by a time increment $\Delta t_B$ and the system returns back to before step S4. This process continues until the predetermined confirmation time $\Delta t_B$ is reached or exceeded, or until a second shift signal is present.

If a second shift signal is registered within the confirmation time $\Delta t_B$, it is checked in the next step S7 whether it is an upshift signal ("+" signal), i.e., whether the selector lever has again been moved in the upshift direction to confirm its earlier actuation. If so, the first movement of the selector lever in the upshift direction interpreted as a provisional command to engage the drivetrain is confirmed, and engagement of the drivetrain is initiated.

For this, in step S9 the current vehicle speed $V_F$ is measured, in step S10 the forward gear $G_{n\_opt}$ appropriate for the vehicle speed $V_F$ is determined, and the drivetrain is engaged by disengaging the separating clutch (step S11), engaging the appropriate forward gear $G_{n\_opt}$ (step S12) and engaging the separating clutch (step S13). Then, the drivetrain control system changes to the normal driving mode.

If, while in the rolling mode of the drivetrain control system, no first shift signal is registered (step S1), or in step S2 a downshift signal ("−" signal) is recognized as the first shift signal, or in step S4 the lapse of the confirmation time $\Delta t_B$ for the input of a second shift signal is determined, or in step S7 a downshift signal ("−" signal) is recognized as the second shift signal, then the shift signal concerned is cancelled in step S8 and, at a suitable point, the rolling mode control system returns back to before step S1.

Thanks to the requirement that in order to engage the drivetrain, the selector lever has to be moved twice in the same shift direction within the confirmation time $\Delta t_B$, erroneous operation and the associated load peaks and discomfort for the driver of the motor vehicle are largely excluded.

INDEXES $G_n$ Forward gear
$G_{n\_opt}$ Appropriate forward gear
i Transmission ratio
$i_{G\_n}$ Transmission ratio of forward gear
N Speed
$N_{GA}$ Speed of transmission output shaft
$N_M$ Motor speed
$N_{M\_max}$ Maximum motor speed
R Reversing gear
$R_n$ Reversing gear
$R_{n\_opt}$ Appropriate reversing gear
S1-S13 Process steps
t Time
$V_F$ Driving speed
$V_{Roll\_max}$ Rolling limit speed
t Time increment
$\Delta t_B$ Confirmation time

The invention claimed is:

1. A method for controlling a motor vehicle drivetrain which comprises a drive motor, a multi-step, automated change-speed transmission and an automated separating clutch arranged between the drive motor and the transmission, and a shifting device with a selector lever which can be moved at least from a neutral position to a first particular position in an upshift direction ("+" direction) for manually initiating an upshift of the transmission and can be moved from the neutral position to a second particular position in the downshift direction("−") for manually initiating a downshift of the transmission, and in which the transmission and the separating clutch can be controlled by a transmission control unit which is connected at least to a speed sensor, a brake pedal actuation sensor and a selector lever actuation sensor, the method comprising the steps of:

when the motor vehicle is moving with its drivetrain disengaged, engagement of the drivetrain being initiated by actuating the selector lever,
interpreting a sensed first movement of the selector lever in a shift direction ("+" direction or "−" direction) from the neutral position to one of the first or the second particular position as a provisional command to engage the drivetrain,
interpreting a sensed subsequent second movement of the selector lever, from the neutral position to the one of the first or the second particular position, in a same shift direction ("+" direction or "−" direction) as the first movement within a specified confirmation time ($\Delta t_B$), as a confirmation of the provisional command to engage the drivetrain and,
automatically engaging the drivetrain as an implementation command in response to the second movement of the selector lever.

2. The method according to claim 1, wherein the provisional command to engage the drivetrain is cancelled if no second movement of the selector lever in the same shift direction ("+" direction or "−" direction) as the first movement is sensed within the confirmation time ($\Delta t_B$).

3. The method according to claim 1, wherein the provisional command to engage the drivetrain is cancelled if, within the confirmation time ($\Delta t_B$), a movement of the selector lever from the neutral position, in an opposite direction ("−" direction or "+" direction respectively) is sensed.

4. The method according to claim 1, wherein the confirmation time ($\Delta t_B$) is set at a value between 2 and 5 seconds.

5. The method according to claim 1, wherein when a twofold movement of the selector lever from the neutral position in the upshift direction ("+" direction) has been sensed, the current vehicle speed ($v_F$) is measured, a forward gear ($G_{n\_opt}$) appropriate for the current vehicle speed ($v_F$) is determined, and the drivetrain is engaged in combination with the engagement of the appropriate forward gear ($G_{n\_opt}$) and the engaging of the separating clutch.

6. The method according to claim 1, wherein when a twofold movement of the selector lever from the neutral position in the downshift direction ("−" direction) has been sensed, the current vehicle speed ($v_F$) is measured, and if only one reversing gear (R) is available the drivetrain is engaged in combination with the engagement of the reversing gear (R) and the engaging of the separating clutch, provided that the current vehicle speed ($v_F$) does not exceed a specified rolling limit speed ($v_{Roll\_max}$) ($v_F \leq v_{Roll\_max}$).

7. The method according to claim 1, wherein when a twofold movement of the selector lever from the neutral position in the downshift direction ("−" direction) has been sensed, the current driving speed ($v_F$) is measured, and if more than one reversing gear ($R_n$) is available, a reversing gear ($R_{n\_opt}$) appropriate for the current driving speed ($v_F$) is determined, and the drivetrain is engaged in combination with the engagement of the appropriate reversing gear ($R_{n\_opt}$) and the engaging of the separating clutch, provided that the driving speed ($v_F$) does not exceed a specified rolling limit speed ($v_{Roll\_max}$) ($v_F \leq v_{Roll\_max}$)

8. The method according to claim 6, wherein the implementation command to engage the drivetrain in combination with the engagement of a reversing gear (R, $R_{n\_opt}$) is cancelled and at least one of an acoustic and a visual warning signal is emitted if the current driving speed ($v_F$) exceeds the specified rolling limit speed ($v_{Roll\_max}$) ($V_F > v_{Roll\_max}$).

9. The method according to any of claim 1, wherein after a first movement of the selector lever from the neutral position in a shift direction ("+" or "−" direction) has been sensed, at least one of an acoustic and a visual signal is emitted for the driver's information.

10. The method according to claim 9, wherein in a gear display means the drive direction (forward or reverse) determined by the movement direction of the selector lever ("+" or "−" direction) is displayed together with a question-mark (for example "D?" or "R?").

11. The method according to claim 9, wherein the signal, informing the driver of a first movement of the selector lever from the neutral position in a shift direction ("+" or "−" direction), is emitted until either the second movement of the selector lever from the neutral position in the same direction ("+" or "−" direction) has been sensed, or until the provisional command to engage the drivetrain has been cancelled.

12. The method according to any of claim 1, further providing the step of the first and the second particular positions being in a manual shift gate that is at least partially separate from an automatic shift gate.

13. A method of controlling a motor vehicle drivetrain which comprises a drive motor, a multi-step, automated change-speed transmission and an automated separating clutch arranged between the drive motor and the transmission, and a shifting device, and in which the transmission and the separating clutch can be controlled by a transmission control unit which is connected at least to a speed sensor, a brake pedal actuation sensor and a selector lever actuation sensor, the method comprising the steps of:

when the drivetrain is engaged, manually initiating an upshift of the transmission by moving a selector lever a single time from a neutral position to a first particular position in an upshift direction ("+" direction);

manually initiating an downshift of the transmission by moving a selector lever a single time from a neutral position to a second particular position in an downshift direction ("+" direction);

when the motor vehicle is moving and the drivetrain disengaged, interpreting a sensed first movement of the selector lever in a shift direction ("+" direction or "−" direction) from the neutral position to one of the first or the second particular position as a provisional command to engage the drivetrain, interpreting a sensed subsequent second movement of the selector lever, from the neutral position to the one of the first or the second particular position, in a same shift direction ("+" direction or "−" direction) as the first movement within a specified confirmation time ($\Delta t_B$), as a confirmation of the provisional command to engage the drivetrain and, automatically engaging the drivetrain as an implementation command in response to the second movement of the selector lever.

\* \* \* \* \*